United States Patent
Leiby et al.

(10) Patent No.: US 11,151,776 B2
(45) Date of Patent: *Oct. 19, 2021

(54) PREDICTION AND THROTTLING ADJUSTMENTS BASED ON APPLICATION RENDERING PERFORMANCE

(71) Applicant: Valve Corporation, Bellevue, WA (US)

(72) Inventors: Aaron Leiby, Seattle, WA (US); Alex Vlachos, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 65 days.

This patent is subject to a terminal disclaimer.

(21) Appl. No.: 16/748,599

(22) Filed: Jan. 21, 2020

(65) Prior Publication Data

US 2020/0160591 A1 May 21, 2020

Related U.S. Application Data

(63) Continuation of application No. 16/056,277, filed on Aug. 6, 2018, now Pat. No. 10,600,236.

(51) Int. Cl.
| | |
|---|---|
| *G06F 1/16* | (2006.01) |
| *G06F 3/14* | (2006.01) |
| *G06F 3/0346* | (2013.01) |
| *G02B 27/01* | (2006.01) |
| *G06T 15/20* | (2011.01) |

(Continued)

(52) U.S. Cl.
CPC ........ *G06T 15/205* (2013.01); *G02B 27/0093* (2013.01); *G02B 27/0172* (2013.01); *G06T 19/006* (2013.01); *G02B 2027/014* (2013.01)

(58) Field of Classification Search
CPC . G06T 15/205; G06T 19/006; G02B 27/0093; G02B 27/0172; G02B 2027/014
See application file for complete search history.

(56) References Cited

U.S. PATENT DOCUMENTS

| | | | |
|---|---|---|---|
| 9,690,099 B2 | 6/2017 | Bar-Zeev et al. | |
| 9,928,655 B1 | 3/2018 | Alston | |
| 10,600,236 B2 * | 3/2020 | Leiby | G06F 3/011 |

(Continued)

OTHER PUBLICATIONS

The PCT Search Report and Written Opinion dated Oct. 21, 2019 for PCT Application No. PCT/US2019/045290, 10 pages.

*Primary Examiner* — Lixi C Simpson
(74) *Attorney, Agent, or Firm* — Lee & Hayes, P.C.

(57) ABSTRACT

Described herein are techniques for adjusting a prediction level and a throttle level, as frames are being rendered on a head-mounted display (HMD), based on an application's rendering performance. The prediction level is increased if a number of late frames, out of a past N rendered frames of (N being any suitable number), meets or exceeds a threshold number of late frames, which causes a compositor of the HMD to predict pose data of the HMD farther out into the future. The throttle level can be increased independently from, or in synchronization with, the increase in the prediction level to causes the compositor to throttle the frame rate of the application (e.g., to a fraction of the refresh rate of the HMD). The prediction level (and the throttle level, if at the same level) can be decreased if a particular number of consecutively-rendered frames finish rendering early.

21 Claims, 6 Drawing Sheets

(51) Int. Cl.
*G06T 19/00* (2011.01)
*G02B 27/00* (2006.01)

(56) References Cited

U.S. PATENT DOCUMENTS

| | | |
|---|---|---|
| 2014/0267420 A1 | 9/2014 | Schowengerdt et al. |
| 2015/0301585 A1 | 10/2015 | Noro et al. |
| 2016/0027141 A1 | 1/2016 | Patel et al. |
| 2018/0081429 A1 | 3/2018 | Akenine-Moller et al. |
| 2018/0082484 A1 | 3/2018 | Mallinson |
| 2018/0315364 A1 | 11/2018 | Yamamoto et al. |
| 2019/0005884 A1 | 1/2019 | Yoo |
| 2019/0243472 A1 | 8/2019 | Stafford et al. |
| 2019/0333263 A1 | 10/2019 | Melkote Krishnaprasad et al. |

\* cited by examiner

RULE #1: INCREASE PREDICTION LEVEL IF:

2 OUT OF LAST 5 FRAMES ARE LATE FRAMES

200(1)

RULE #2: INCREASE THROTTLE LEVEL IF:

3 OUT OF LAST 20 FRAMES ARE OVER-PRESENTED FRAMES

200(2)

RULE #3: DECREASE PREDICTION LEVEL IF:

30 EARLY FRAMES IN A ROW

200(3)

PREDICTION AND THROTTLING ADJUSTMENTS BASED ON APPLICATION RENDERING PERFORMANCE

CROSS REFERENCE TO RELATED APPLICATION

This patent application is a continuation of and claims priority to co-pending and co-owned U.S. patent application Ser. No. 16/056,277, filed Aug. 6, 2018, entitled "PREDICTION AND THROTTLING ADJUSTMENTS BASED ON APPLICATION RENDERING PERFORMANCE," which is hereby incorporated in its entirety by reference.

BACKGROUND

Virtual reality (VR) systems are used both within and outside of the video game industry. Displays for VR systems, such as those embedded in a VR headset, typically operate at a minimum refresh rate that is suitable for VR applications. For instance, 90 Hertz (Hz) is a common refresh rate for VR displays. In a "live rendering" scenario, a graphics-based application, such as a video game, outputs frames for rendering at a frame rate that matches the refresh rate of the display, meaning that a new frame received from the application (referred to herein as an "actual frame") is displayed at every screen refresh. Such a live rendering scenario is often referred to as the application "making frame rate" or "hitting frame rate."

In practice, an application does not always make frame rate for various reasons. For example, the application may intermittently drop a frame, and/or the application may temporarily output frames at a slower rate (e.g., 45 frames per second when the ideal frame rate is 90 frames per second). In situations where the application is not making frame rate, a technique called "rotation-only re-projection" can be used to replace missing frames with re-projected frames in a way that accounts for the user's head rotation, making it appear to the user as if the application is making frame rate. Without re-projection, for example, a deficient frame rate from the application may cause in-game stuttering or hitching. In VR applications, where the user is fully immersed in the virtual environment, the user can become nauseous if the application fails to make frame rate and there is no re-projection to compensate for the missing frames. Thus, re-projection is a technique that allows for a better user experience when an application is not making frame rate. Consider an example where the application is outputting frames at half the ideal frame rate (e.g., 45 frames per second where 90 frames per second is the ideal frame rate). In this example, every other frame can be re-projected using pixel data from the most recently-rendered actual frame to create a re-projected frame that transforms the scene (e.g., through rotation and re-projection calculations) to match the re-projected scene to the user's current head orientation. This makes it look to the user as if the scene is moving in a way that is expected given the user's head rotation.

Although rotation-only re-projection mitigates in-game stuttering or hitching, it produces its own unwanted visual artifacts during head rotation, at least in VR systems that use low-persistence displays (e.g., where the display is illuminated for a small fraction of the frame time). For example, although rotation-only re-projection accounts for head rotation, it does not account for objects that move or animate in the scene between frames. This can cause an unwanted visual artifact called "judder" to occur with respect to moving or animating objects. Judder causes the user to perceive a "double ghosting effect" where a moving object (e.g., a bullet or a ball moving across the screen) appears to bounce between two locations (or separate from itself) frame-to-frame. Accordingly, when the user rotates his/her head while re-projection is being used, any moving or animating objects in the scene will judder. Because the rendering performance of the application is unpredictable, the frame rate of the application tends to move in and out of phase with the vertical synchronization (VSync) signals of the display by varying amounts and at random times, and the aforementioned judder of moving objects can become erratic and intolerable to the viewing user.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
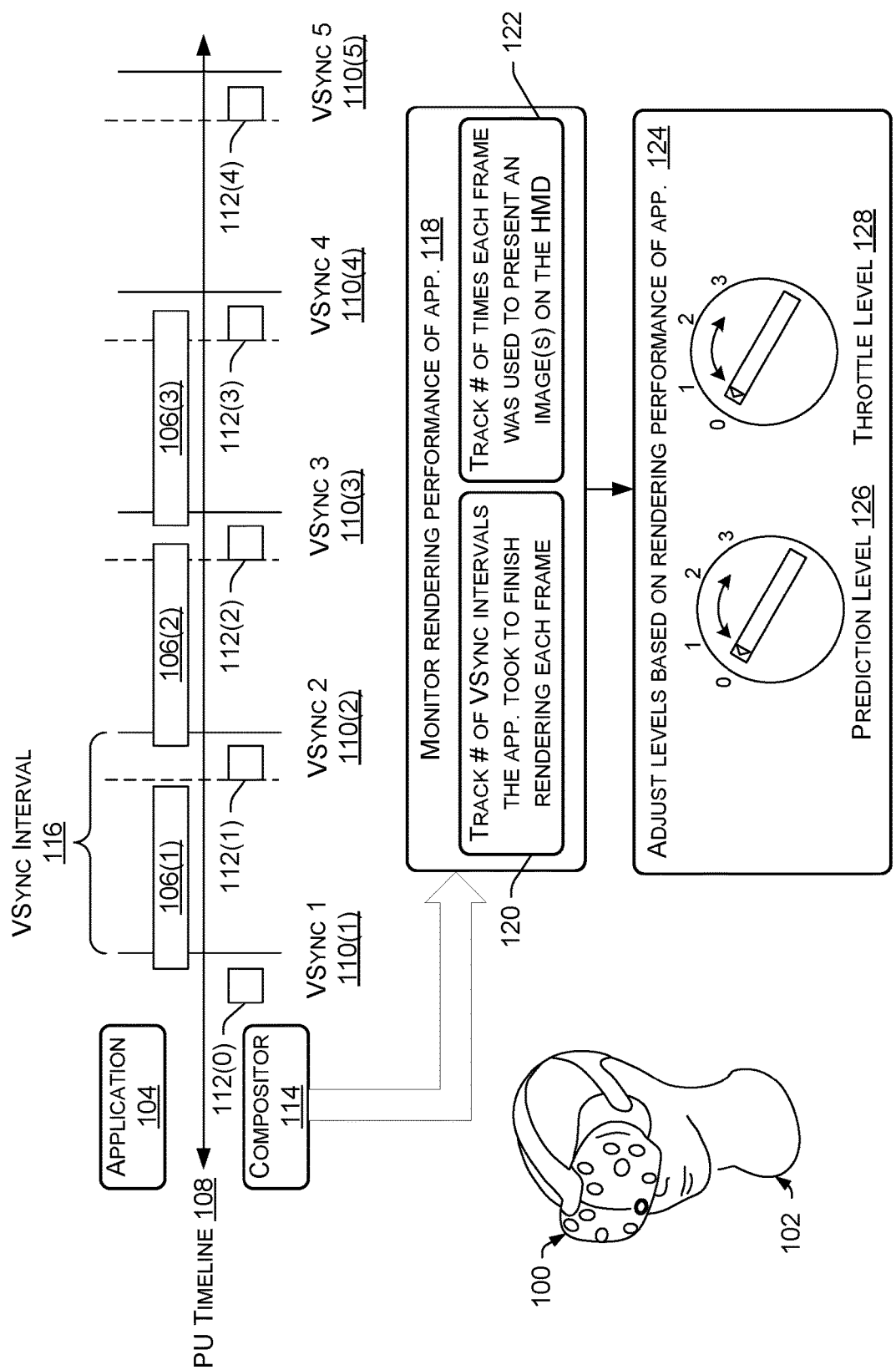
FIG. 1 is a diagram illustrating an example technique for adjusting prediction and throttling levels based on the rendering performance of an application.

Described herein are, among other things, techniques for adjusting a prediction level and a throttle level, as frames are being rendered on a head-mounted display (HMD), based on an application's rendering performance. The adjustments to the prediction level and the throttle level mitigate unwanted visual artifacts that can manifest in the images presented on the HMD when the application's performance degrades (e.g., when the application fails to make frame rate).

A HMD may be worn by a user for purposes of immersing the user in a virtual reality (VR) environment or an augmented reality (AR) environment. One or more display panels of the HMD render images based on frames that are output by an application (e.g., a video game), and these images are viewed by a user through the optics that are included in the HMD, making the user perceive the images as if the user was immersed in a VR or AR environment. As mentioned, the HMD may utilize a technique called "re-projection" to compensate for the application failing to make frame rate. For example, re-projected frames can be rendered between actual frames to achieve an ideal frame rate, and each re-projected frame can be generated using pixel data from a recently-rendered actual frame that was received from an application (e.g., the most recently-rendered actual frame). In the re-projected frame, a scene rendered in the previous actual frame is transformed (e.g., through rotation and re-projection calculations) in a way that accounts for the user's head rotation. If the application's rendering performance degrades to a certain point and/or erratically, unwanted visual artifacts, such as judder, can manifest in a manner that is intolerable to a viewing user.

Described herein are techniques for mitigating unwanted visual artifacts through real-time adjustments (up or down) to a prediction level and a throttle level. The prediction level relates to how far in the future a set of poses (pose data) of the HMD is predicted. For example, when the application is making frame rate, a compositor—which provides pose data to the application for use in rendering frames—may predict pose data of the HMD for a time that corresponds to two vertical synchronization (VSync) intervals in the future, relative to a time of predicting the pose data. Accordingly, the prediction level can be increased from this base prediction level in increments of one VSync interval so that the compositor is able to predict pose data farther out in the future, such as three VSync intervals in the future, four VSync intervals in the future, and so on. This can also be thought of as adjusting the number of frames into the future at which the compositor predicts pose data for a given frame that the application is going to render. Thus, when the application is making frame rate, the compositor might predict pose data out one frame into the future, and, if the prediction level is increased from that base prediction level, the compositor can predict pose data out two frames into the future, three frames into the future, and so on.

An example reason for adjusting the prediction level in this manner is as follows. If an application is not making frame rate (e.g., taking multiple VSync intervals to render each frame), then an individual frame is used multiple times to display images to the user. Furthermore, displaying frames at a time other than the time it was predicted for causes the compositor to use re-projection to mitigate judder. However, re-projection does not account for objects that move or animate in the scene between frames, so prediction helps to mitigate the unwanted visual artifacts that are caused by the use of re-projection in this context. In an illustrative example, if frames are taking two VSync intervals to render, then most likely the frames will also be used twice to display images to the user. Since the predicted poses used to render an individual frame target a single time, that time is only correct for one of the two times the frame is used to present an image to the user. That said, it is possible for the time to be incorrect for both times it is used. For instance, if pose data for a given frame was predicted one VSync interval in the future, and the application took two VSync intervals to render the frame, then the frame will be used twice for generating two re-projected frames. By increasing the prediction level to predict pose data one additional VSync interval in the future (e.g., two VSync intervals), the pose data will be correct the first time the frame is used, and, in this scenario, the frame will be used a single time (instead of twice) for a single re-projected frame.

The throttle level relates to how much the frame rate of the application is throttled. For example, when the application is making frame rate, a compositor may throttle the application's frame rate to match the refresh rate of the HMD (e.g., 90 Hz). Accordingly, the throttle level can be increased from this base throttle level in increments so that the compositor throttles the application's frame rate more and more, such as throttling the application's frame rate to half of the refresh rate of the HMD, to a third of the refresh rate of the HMD, and so on. This can also be thought of as adjusting the number of times that each actual frame from the application is used to present an image(s) on the HMD. Thus, when the application is making frame rate, the compositor uses each frame output by the application (e.g., each actual frame) once to present a corresponding image on the HMD. If the throttle level is increased from that base throttle level, the compositor can use each actual frame twice, three times, and so on, in order to present multiple corresponding images on the HMD. For example, if the application's frame rate is throttled to half of the refresh rate of the HMD, an individual frame from the application may be used twice, at least one of those times for generating a re-projected frame that fills the gap between actual frames output by the application.

An example reason for adjusting the throttle level in this manner is as follows. Most applications don't handle variable frame deltas particularly well, and even if they did handle them correctly, the user experience is better if the generated frames are evenly spaced in time, creating an overall smoother experience. There is, however, an in between state where frames are taking slightly more than one VSync interval to render. In this state, most frames are still displayed a single time. This cascades, however, making each frame finish a little bit later until a single frame is displayed twice and the cycle starts over. There is a threshold for these multiply-displayed frames where the user experience is better to allow the cascading than to immediately start throttling the application. Accordingly, increasing the throttle level helps when this threshold is crossed.

In an example process, first frames of a series of frames are rendered on a HMD using a prediction level set to a first prediction level and a throttle level set to a first throttle level. The first prediction level causes a compositor of the HMD to predict pose data of the HMD for a time that corresponds to a first target number of VSync intervals (e.g., two VSync intervals) in the future, relative to a time of predicting the pose data for individual ones of the first frames. The compositor may then determine whether a number of late frames, out of a past N rendered frames of the first frames (N being any suitable number), meets or exceeds a threshold number of late frames. Here, a late frame is a frame that took more than the first target number of VSync intervals for the application to finish rendering using a graphics processing unit (GPU) of the HMD. If the number of late frames meets or exceeds the threshold number of late frames, the compositor may increase the prediction level from the first prediction level to a second, greater prediction level, and second frames of the series of frames are rendered thereafter using the prediction level set to the second prediction level. The second prediction level may cause the compositor to predict pose data for a time that is farther out in the future, as compared to the first prediction level. For example, at the second prediction level, the compositor may predict pose data for a time that corresponds to a second target number of VSync intervals, such as three VSync intervals, in the future, which is greater than the first target number of VSync intervals (e.g., two VSync intervals).

The throttle level can be increased independently from increases in the prediction level, or in synchronization with increases in the prediction level. When the throttle level is increased independently of prediction level increases, the throttle level may be increased based on a determination that a number of over-presented frames, out of a past M rendered frames (M being any suitable number), meets or exceeds a threshold number of over-presented frames. Here, an over-presented frame is a frame that was used more than the target number of times for the current throttle level. For instance, the first throttle level may cause the compositor to throttle the frame rate of the application to match the refresh rate of the HMD, meaning that an individual frame is targeted to be used once (a first target number of times) to present a corresponding image on the HMD. In this scenario, an over-presented frame is one that was used more than once (more than the first target number of times) to present corresponding images on the HMD. The throttle level can be increased from the first throttle level to the second throttle level based on a determination that the number of over-presented frames, out of the past M rendered frames, meets or exceeds the threshold number of over-presented frames, thereby causing the compositor to throttle the frame rate of the application to a fraction of the refresh rate of the HMD (e.g., to half of the refresh rate). Otherwise, the throttle level can be increased in synchronization with the prediction level whenever the prediction level is increased.

The prediction level may be decreased if the application finished rendering a past P consecutively-rendered frames (P being any suitable number) "early" in the sense that the frames finished rendering faster than the current prediction by at least one VSync interval. For example, if the current prediction level is set to a second prediction level that causes the compositor to predict the pose data of the HMD out three VSync intervals into the future, a frame is considered to have finished rendering early if the application finishes rendering the frame in no more than two VSync intervals. The throttle level may be decreased in synchronization with a decrease in the prediction level, so long as the throttle level is equal to the prediction level; otherwise the throttle level is left as is if the throttle level is less than the prediction level.

Also disclosed herein are systems, for example, systems including a display system (e.g., a HMD), configured to implement the techniques and processes disclosed herein, as well as non-transitory computer-readable media storing computer-executable instructions to implement the techniques and processes disclosed herein. Although the techniques and systems disclosed herein are discussed, by way of example, in the context of video game applications, and specifically VR gaming applications, it is to be appreciated that the techniques and systems described herein may provide benefits with other applications, including, without limitation, non-VR applications (e.g., AR applications), and/or non-gaming applications, such as industrial machine applications, defense applications, robotics applications, and the like.

FIG. 1 is a diagram illustrating an example technique for adjusting prediction and throttling levels based on the rendering performance of an application. FIG. 1 depicts a head-mounted display (HMD) 100 worn by a user 102. The HMD 100 is an example "display system" that can implement the disclosed techniques, although other types and/or implementations of a "display system" may benefit from the techniques described herein. The HMD 100 in the example of FIG. 1 may include multiple display panels, such as a left display panel and a right display panel of a stereo pair of display panels. These display panels may be used to present a series of image frames (herein referred to as "frames") that are viewable by a user 102 wearing the HMD 100. Although examples are described with a two-panel HMD 100, it is to be appreciated that the HMD 100 may include a single display panel, or more than two display panels. Hence, the terms "display panel," as used herein, may refer to either display panel of a pair of display panels of a two-panel HMD 100, or it may refer to a single display panel of a HMD 100 with any number of display panels (e.g., a single-panel HMD 100 or a multi-panel HMD 100). In a two-panel HMD 100, a stereo frame buffer may render, for instance, 2160× 1200 pixels on both display panels of the HMD 100 (e.g., 1080×1200 pixels per display panel).

The HMD 100 may include display panels that utilize any suitable type of display technology, such as an emissive display that utilizes light emitting elements to emit light during presentation of frames on the display panel(s) of the HMD 100. As an example, display panels of the HMD 100 may comprise liquid crystal displays (LCDs), organic light emitting diode (OLED) displays, inorganic light emitting diode (ILED) displays, or any other suitable type of display that utilizes a suitable display technology for HMD applications. In some embodiments, the display system of the HMD 100 may be a low-persistence display system, meaning that the light emitting elements emit light for a small fraction of a frame time (e.g., roughly 1 millisecond (ms) out of a frame time of 11.11 ms) for each frame that is used to render an image on the display panels.

The HMD 100 may represent a VR headset for use in VR systems, such as for use with a VR gaming system. However, the HMD 100 may additionally, or alternatively, be implemented as an AR headset for use in AR applications. In AR, a user 102 sees virtual objects overlaid on a real-world environment, whereas, in VR, the user 102 does not see a real-world environment, but is fully immersed in a virtual environment, as perceived via the display panels and the optics (e.g., lenses) of the HMD 100. Examples described herein pertain primarily to a VR-based HMD 100, but it is to be appreciated that the HMD 100 is not limited to implementation in VR applications.

In general, an application 104 executing on a computing device—such as the HMD 100 itself, or a computing device (e.g., a personal computer (PC), game console, etc.) associated with, and coupled to, the HMD 100—may be configured to output a series of frames 106(1), 106(2), 106(3), and so on (collectively 106). The series of frames 106 are ultimately rendered on the display panel(s) of the HMD 100. In some embodiments, off-screen rendering is utilized such that the frames 106 can be rendered to a target before being rendered on a display panel of the HMD 100. Thus, "rendering," as used herein, can include rendering to a target other than a display and before rendering on the display itself, and/or rendering on the display (e.g., without, or after, off-screen rendering to a different target).

The example of FIG. 1 depicts three example frames 106(1), 106(2), and 106(3) on a graphics processing unit (GPU) timeline 108 to illustrate how timing can vary between the frames 106 finishing rendering and the vertical synchronization (VSync) signals 110 of the HMD 100. Here, the application 104 renders frame 106(1) first, then frame 106(2), and then frame 106(3), in sequence, from left to right on the GPU timeline 108. The GPU timeline 108 also shows the rendering workloads 112 of a compositor 114 of the HMD 100 towards the end of each VSync interval 116.

In general, the display system of the HMD 100 may utilize VSync signals 110 for synchronizing display-related events to a refresh cycle of the display. For example, if the HMD 100 has a refresh rate of 90 Hz, the VSync signals 110 pulse at a rate of 90 times a second. At a refresh rate of 90 Hz, the VSync intervals 116 are about 11.11 ms long. Sometimes the VSync interval 116 of a 90 Hz HMD 100 is referred to as an 11 ms interval, although it is understood that the VSync interval 116 can be calculated as 1000 ms÷90, for a 90 Hz display system, and the VSync signals 110(1) at the boundaries of the VSync intervals 116 represent the flashes of the display panel(s) of the HMD 100 (e.g., when the panels turn on and the user 102 sees the image), which may occur over a period of time that is very small compared to the frame time, or the time of the VSync interval 116, even though FIG. 1 illustrates the VSync signals 110 as instantaneous points of time on the GPU timeline 108.

The frames 106 that are shown in FIG. 1 are meant to represent "actual" frames in the sense that they are output from the application 104, which may represent a video game application, or any other type of graphics-based application. The application 104 may be executed in a graphics pipeline that outputs pixel data to a frame buffer for rendering the individual frames 106. Pixel data for each frame 106 may, in some embodiments, include a two-dimensional array of per-pixel values (e.g., color values). In some embodiments, the pixel data further includes additional data or metadata, such as depth values. In some embodiments, pixel data may include data for each pixel that is represented by a single set of color and alpha values (e.g., one color value for a red channel, one color value for a green channel, one color value for a blue channel, and one or more values for one or more alpha channels. This pixel data can be output to a frame buffer to present on image on the display panel(s) of the HMD 100 with a desired visual effect.

During runtime, a head tracking module of the HMD 100 may generate data about the position and pose of the HMD 100. The compositor 114 is configured to predict pose data (e.g., a set of poses) of the HMD 100 at a time in the future, and to provide this predicted pose data to the application 104 in order to inform the application 104 regarding how to render a next frame 106 in the series of frames 106 in accordance with the user's 102 predicted head position/pose. The reason that the compositor 114 predicts the pose data of the HMD 100 at a future time, instead of the current pose of the HMD 100, is because the given frame 106 (assuming the application 104 is making frame rate) will actually be presented as an image on the display panel(s) of the HMD 100 at some time in the future (e.g., about 25 ms after the time when the pose data is provided to the application 104). That is, the display with the pixel data corresponding to a given frame 106 actually emits photons for that frame 106 about 25 ms after the pose data was provided to the application 104 for rendering that frame 106. Providing the pose data to the application 104 in advance allows the application 104 to output pixel data for rendering imagery on the HMD 100 in a way that makes the user 104 believe he/she is looking around a virtual environment that includes objects (both static and moving objects). Both static and moving objects are perceived to move within the scene in an expected manner along with the user's 102 head movement if the application is making frame rate.

The graphics logic of the HMD 100 may be asynchronous, or synchronous. In an asynchronous system, the compositor 114 runs separate (on a separate, asynchronous thread) from the application 104 on a GPU of the HMD 100. For instance, the compositor 114 may provide the application 104 with pose data (predicted to VSync 3 110(3)) for rendering the frame 106(1). Assuming the application 104 finishes rendering before the compositor's workload 112(1) starts, the compositor 114 is configured to take the frame 106(1) (e.g., left and right image frames) from the application 104 and distort the frame 106 into the back buffers onto the display panels of the HMD 100. For example, the compositor 114 may perform chromatic distortion, panel masking, and the like, before rendering a final image on the HMD 100 based on the frame 106(1) output by the application 104. The compositor 114 may execute in a high-priority context mode, which means that when it is time for the compositor 114 to start its next workload 112(1), the GPU driver allows the compositor 114 to preempt the application 104 (e.g., by interrupting the application 104 from rendering, if it is still rendering a frame 106, and/or preventing the application 104 from starting to render a next frame 106). The compositor 114 may allocate a time slot (up to 1 ms on average) at the end of each VSync interval 116 to do its work 112, regardless of what is happening with the application 104. Thus, at every VSync signal 110, the compositor 114 renders "something" in the sense that the compositor 114 obtains the best frame 106 it can obtain from the application 106 (e.g., either a fresh/new frame 106, or a previously-rendered frame 106), and the compositor 114 uses the pixel data associated with that frame 106 to put pixel data in the frame buffer for output on the display panel(s) of the HMD 100.

In some embodiments, the compositor 114 can make a copy of a current value in a constant buffer to determine what frame 106 to use for rendering at the next VSync signal 110. That is, the compositor 114 may obtain the frame 106 corresponding to the value in a constant buffer, determine which VSync signal 110 the frame 106 was targeted for, and if not the same as the next, upcoming VSync signal 110, the compositor 114 can utilize re-projection to modify the pixel data of the frame 106 to match the pose data predicted for the next VSync signal 110. The compositor's 114 ability to output different pixel data for each VSync interval 116, no matter what, is the mechanism that keeps everything "live" and keeps the images rendered on the HMD 100 from hitching badly when the application 104 is not making frame rate.

In the example of FIG. 1, consider a case where the application 104 has just finished rendering frame 106(0) (not shown), and is ready to start rendering frame 106(1). At this point in time, the application 104 may call a function to receive pose data from the compositor 114 for use in rendering the frame 106(1). The compositor, at a current prediction level set to a first level (e.g., prediction level=0) predicts pose data of the HMD 100 for a time that corresponds to a first target number of VSync intervals 116 in the future, which may be two VSync intervals 116 in the future, relative to a time of predicting the pose data for the first frame 106(1). For example, the compositor 114 may predict pose data of the HMD 100 according to a predicted future pose of the HMD 100 at a time corresponding to VSync 3 110(3). For example, the 106(1) may start scanning out at VSync 2 110(2), and it may take yet another full VSync interval 116 to load into the display panel(s) of the HMD 100 before the display panel(s) is illuminated. If the HMD 100 uses a rolling illumination (instead of a global flashing illumination) display—which means that the photons emitted from the display panel(s) scan from top to bottom over a subset of the VSync interval 116 as they are being scanned out into the display (after a short settling period), the compositor 114 may predict pose data of the HMD 100 for a time corresponding to a midpoint of the scan-out period so that elements in the center of the user's view are the most stable.

The application 104 may use this pose data to render the frame 106(1) in accordance with the pose data. The application 104 may start rendering the frame 106(1) as soon as the compositor 114 finishes its work 112(0) for the previous frame 106(0) (not shown). Alternatively, in a synchronous system where the GPU of the HMD 100 supports multiple compute resources, the compositor 114 may perform its work 112 on a first compute resource, and the application 104 may begin rendering on a second compute resource while the compositor 114 performs its work 112. In any case, FIG. 1 shows an example where the application 104 finishes rendering the frame 106(1) before the time scheduled for the compositor work 112(1) to hit VSync 2 110(2). The application 104, upon finishing the rendering of the frame 106(1), may increment a single integer in a constant buffer on the GPU. This constant buffer may store data for a number of frames (e.g., 3 frames with integers of 0, 1, and 2) corresponding to the most recently rendered frames 106. The compositor 114 may obtain the latest frame that is ready for use based on the value of the integer in the constant buffer. The compositor 114 can make a copy of the integer value and maintain a constant buffer with the copied index value, which is used for the compositor workload 112(1), and the frame 106(1) is finished rendering before the targeted VSync 2 110(2).

When the compositor 114 is done with its work 112(1), the compositor 114 may copy the constant buffer to a CPU of the HMD 100, which allows the CPU of the HMD 100 to determine that the frame 106(1) corresponding to the constant buffer index was rendered at VSync 2 110(2). In this manner, the compositor 114 can monitor the rendering performance of the application at 118 by tracking, at 120, a number of VSync intervals 116 the application 104 took to finish rendering the frame 106(1). In this case, the application 116 took one VSync interval 116 to render the frame 106(1). The compositor 114 can also monitor the rendering performance of the application at 118 by tracking, at 122, a number of times the frame 106(1) was used to present one or more images on the HMD 100. In this case, the frame 106(1) is used twice to present two corresponding images on the HMD 100. This is because the application 104 did not finish rendering the next frame 106(2) before the scheduled time for the compositor 114 to perform its work 112(2) for the VSync 3 110(3), and, as a consequence, the compositor 114 obtains the latest value from the constant buffer corresponding to the frame 106(1), determines that the frame 106(1) was targeted for VSync 2 110(2), and implements re-projection to modify the pixel data of the frame 106(1) using re-projection transforms to render a re-projected frame (based on the frame 106(1)) at VSync 3 110(3), which has been adjusted for the pose data predicted for VSync 3 110(3). At the next VSync interval 116, when the compositor 114 begins its work 112(3), the compositor 114 may obtain the latest integer value from the constant buffer corresponding to frame 106(2), may determine that frame 106(2) was targeted for VSync 3 110(3), and may generate a re-projected frame (based on the frame 106(2)) at VSync 4 110(4).

This may continue as the series of frames 106 are rendered, with the compositor 114 determining how to present pixel data on the HMD 100, based on the frames 106 output from the application 104. In this manner, the compositor 114 can continually monitor the applications rendering performance at 118, and may track statistics, such as those shown at blocks 120 and 122.

At 124, the compositor 114 may adjust a prediction level 126 and/or a throttle level 128 in accordance with the rendering performance of the application 104, as determined from the statistics tracked at blocks 120 and 122. The example of FIG. 1 shows how the prediction level 126 and the throttle level 128 may be independently adjustable using a same scale (e.g., 0 to 3, representing a first level, a second level, a third level, and a fourth level). In this manner, if the prediction level 126 is set to the first level (e.g., 0) and the throttle level 128 is set to the first level (e.g., 0), the prediction level 126 and the throttle level 128 are considered to be set to the same level. These levels may be incremental, such that a first level (e.g., 0) represents a minimum level, and the level may be incremented to the second level (e.g., 1), and then to the third level (e.g., 2), and then to the fourth level (e.g., 3), which may represent a maximum level beyond which the prediction level 126 and the throttle level 128 cannot be increased any further. It is to be appreciated, however, that a limitation in the form of a maximum level is optional, and the prediction level 126 and the throttle level 128 may, in theory, be adjustable to an infinite number of higher levels from a base level. That said, in practice, the ability to increase the prediction level 126 is inherently limited by the ability to predict the future effectively given the constraints of the HMD 100 sensors (e.g., tracking method) and human physiology. It is also a function of the VSync interval 116 (e.g., higher native framerate HMDs 100 have a shorter VSync interval 116, which results in a higher maximum to achieve similar prediction limits).

As mentioned, the prediction level 126 relates to how far in the future a set of poses (pose data) of the HMD 100 is predicted. For example, when the prediction level 126 is set to the first level (e.g., 0), the compositor 114 may predict pose data of the HMD 100 for a time that corresponds to two VSync intervals 116 in the future, relative to a time of predicting the pose data. In the example of FIG. 1, this means that the compositor 114 may predict pose data for a time that corresponds to VSync 3 110(3), and provide that pose data to the application 104 for rendering frame 106(1). The throttle level 128 relates to how much the frame rate of the application 104 is throttled. For example, when the throttle level 128 is set to the first level (e.g., 0), the compositor 114 may throttle the application's 104 frame rate to match the refresh rate of the HMD (e.g., 90 Hz). These levels can be incrementally increased from level 0 to levels 1, 2, and 3 in order to predict pose data out further and to throttle the application 104 by larger degrees. For example, increasing the prediction level 126 from the first level (e.g., 0) to the second level (e.g., 1) may cause the compositor 114 to predict the pose data of the HMD 100 for a time that corresponds an increased number of VSync intervals 116 in the future, such as three VSync intervals 116. In the example of FIG. 1, this means that the compositor 114 may predict pose data for a time that corresponds to VSync 4 110(4), and provide that pose data to the application 104 for rendering frame 106(1). In terms of throttling, an increase from a first throttle level (e.g., 0) to a second throttle level (e.g., 1) may cause the compositor 114 to throttle the frame rate of the application 104 to a fraction of the refresh rate of the HMD 100 (e.g., half of the refresh rate). For a 90 Hz HMD 100, this would mean that the second throttle level (e.g., 1) may throttle the application to 45 frames per second. When this is done, the compositor may delay the provisioning of requested pose data to the application 104, even if the application 104 is asking for pose data at an earlier time, thereby forcing the application 104 to slow down its frame output to a predictable frame rate that the application 104 may have an easier time meeting.

Figure 2:
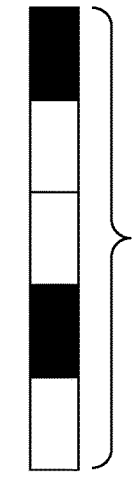
FIG. 2 is a diagram conceptually illustrating example ring buffers that may be used to store statistics relating to an application's rendering performance, the statistics usable to determine whether and when to adjust prediction and throttling levels.
Figure 2:
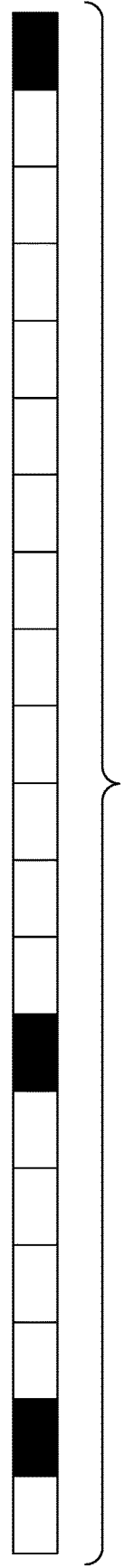
Figure 2:
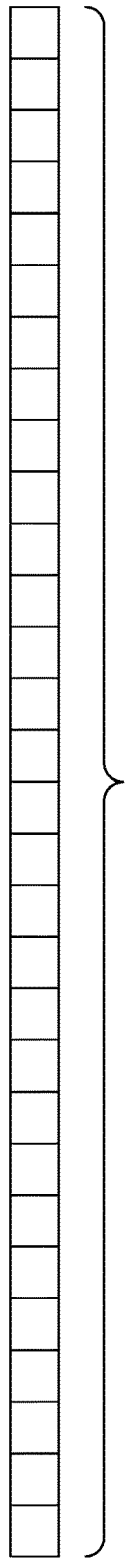

FIG. 2 is a diagram conceptually illustrating example ring buffers 200(1), 200(2), and 200(3) that may be used to store statistics relating to an application's 104 rendering performance, such as the statistics described as being tracked at blocks 120 and 122 of FIG. 1. That is, the ring buffers 200, or any type of memory or storage element for that matter, may be used to track, among other statistics, a number of VSync intervals 116 the application 104 took to finish rendering each frame 106, and the number of times each frame 106 was used to present one or more corresponding images on the HMD 100. With these statistics, the compositor 114 may determine how many of the rendered frames 106 are "late frames", how many of the rendered frames 106 are "over-presented frames", and/or how many of the rendered frames 106 are "early frames." These determinations may be used with three example rules (Rule #1, Rule #2, and Rule #3) for determining whether and when to independently adjust the prediction level 126 and the throttle level 128.

Rule #1 is used to determine whether and when to increase the prediction level 126 by one increment. Here, the example Rule #1 says to increase the prediction level 126 by one increment if two out of the last five rendered frames 106 are "late frames." A "late frame" is a frame 106 that took more than a target number of VSync intervals 116 for the application 104 to finish rendering using the GPU of the HMD 100. For example, if the prediction level 126 is currently set to the first level (e.g., 0), the target number of VSync intervals 116 may be one VSync interval 116, meaning that the application 104 is supposed to finish rendering each frame 106 within one VSync interval 116. In this scenario, if the application 104 does not finish rendering a frame 106 within one VSync interval 116, that frame 106 is considered a "late frame." Similarly, when the prediction level 126 is currently set to the second level (e.g., 1), the target number of VSync intervals 116 may be two VSync intervals 116, meaning that the application 104 is supposed to finish rendering each frame 106 within two VSync intervals 116. Accordingly, the lateness of a frame is relative to the targeted number of VSync intervals 116 in which it is to finish rendering. In the example of FIG. 2, the example Rule #1 is merely an example, and other ratios can be utilized. Thus, Rule #1 can be generally stated as: increase the prediction level 126 by one increment if a number of late frames, out of a past N rendered frames, meets or exceeds a threshold number of late frames. The example here is two out of the past five rendered frames.

Rule #2 is used to determine whether and when to increase the throttle level 128 by one increment. Here, the example Rule #2 says to increase the throttle level 128 by one increment if three out of the last twenty rendered frames 106 are "over-presented frames." An "over-presented frame" over-presented frame is a frame 106 that was used more than a target number of times to present multiple corresponding images on the HMD 100. For example, if the throttle level 128 is currently set to the first level (e.g., 0), the target number of times that each frame is to be used may be once because the frame rate of the application 104 is throttled to match the refresh rate of the HMD 100, and each frame 106 is targeted to be used once per VSync interval 116. In this scenario, if the application 104 is not making frame rate, and a given frame 106 is used twice (once as a fresh frame, and once for a re-projected frame), that frame 106 is considered an "over-presented frame." Similarly, when the throttle level 128 is currently set to the second level (e.g., 1), the target number of times that each frame is to be used may be twice because the frame rate of the application 104 is throttled to half of the refresh rate of the HMD 100. In the example of FIG. 2, the example Rule #2 is merely an example, and other ratios can be utilized. Thus, Rule #2 can be generally stated as: increase the throttle level 128 by one increment if a number of over-presented frames, out of a past M rendered frames, meets or exceeds a threshold number of over-presented frames. The example here is three out of the past twenty rendered frames.

Rule #3 is used to determine whether and when to decrease the prediction level 126 by one increment. Here, the example Rule #3 says to decrease the prediction level 126 by one increment if the last 30 consecutively-rendered frames are "early frames." An "early frame" is a frame 106 that the application 104 finished rendering early in the sense that it beat the current prediction by at least one VSync interval 116. For example, if the prediction level 126 is currently set to the second level (e.g., 1), the application 104 is targeted to finish rendering each frame 106 within three VSync intervals 116. In this scenario, if the application 104 takes no more than two VSync intervals 116 to finish rendering a given frame 106 using the GPU of the HMD 100, that frame 106 is considered an "early frame." If a predetermined number of rendered frames (the past P consecutively-rendered frames) meet this criterion, the application 104 is considered to be performing well enough to justify a decrease in the prediction level 126. The example here is the past 30 consecutively-rendered frames, but any suitable number can be utilized for Rule #3.

The processes described herein are illustrated as a collection of blocks in a logical flow graph, which represent a sequence of operations that can be implemented in hardware, software, firmware, or a combination thereof (i.e., logic). In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3A:
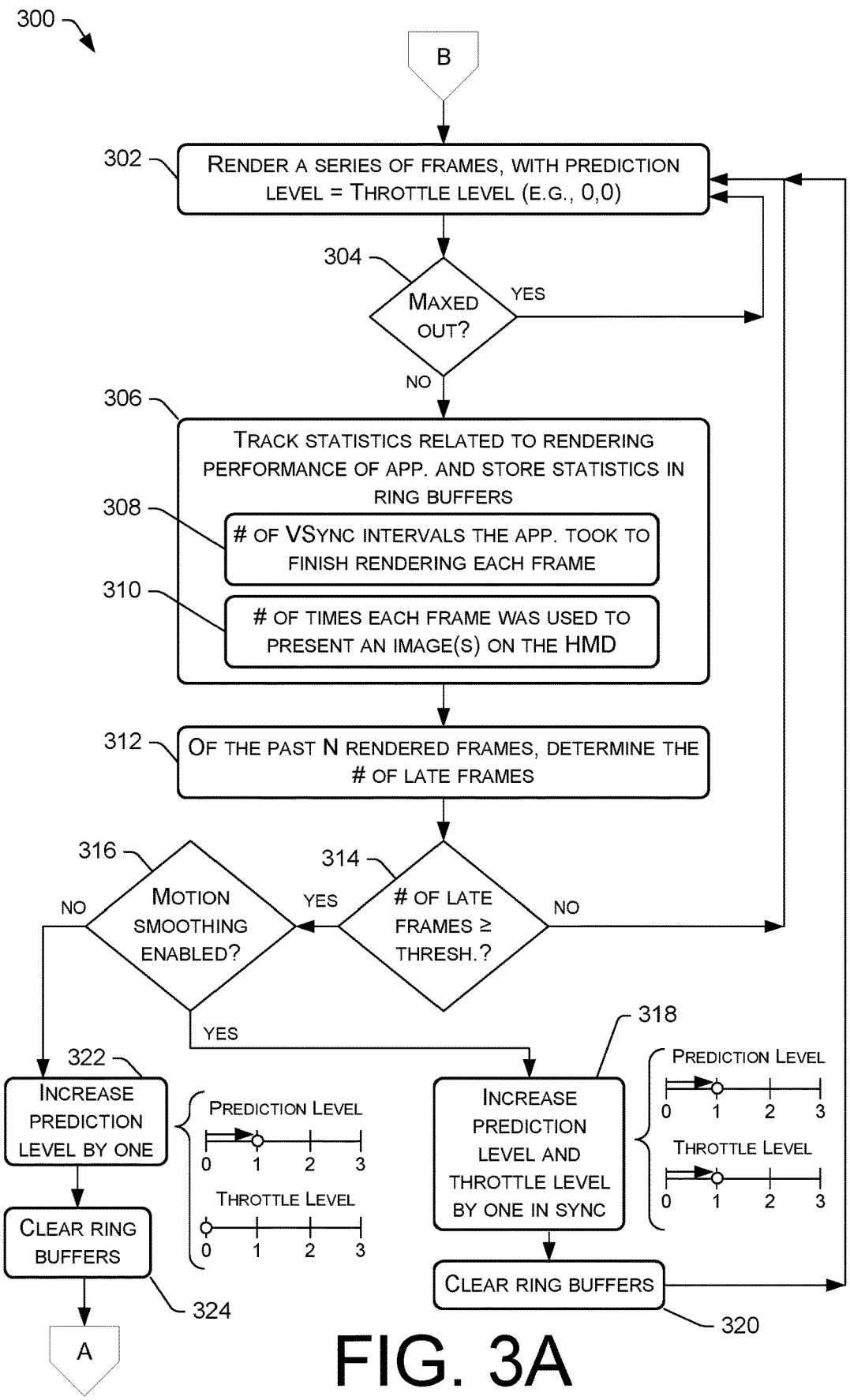
FIGS. 3A and 3B illustrate a flow diagram of an example process for determining whether and when to increase prediction and throttling levels while rendering frames on a head-mounted display (HMD), in accordance with embodiments disclosed herein.
Figure 3B:
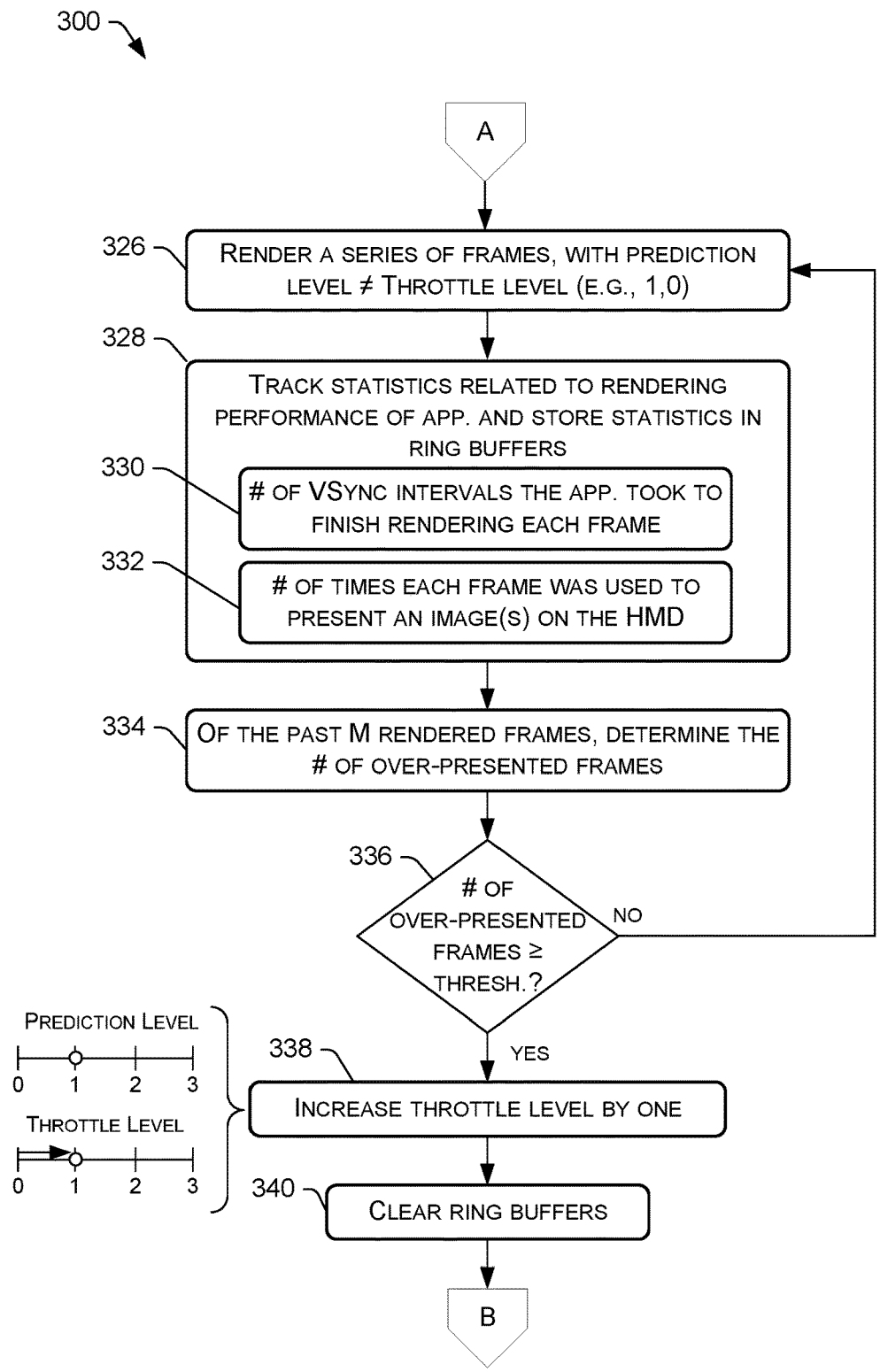

FIGS. 3A and 3B illustrate a flow diagram of an example process 300 for determining whether and when to increase prediction and throttling levels while rendering frames on a HMD, in accordance with embodiments disclosed herein. For discussion purposes, the process 300 is described with reference to the previous figures.

At 302, logic of a HMD 100 (e.g., logic including the compositor 114) may render first frames 106 of a series of frames 106 on the HMD 100 using a prediction level 126 set to a first level and a throttle level 128 set to a first level (i.e., the prediction level 126 and the throttle level 128 are set to a same level using the same scale). At startup of the HMD 100 this same level may be a minimum level. In this case, the minimum throttle level (e.g., 0) causes the compositor 114 to throttle a frame rate of the application 104 to match a refresh rate of the HMD 100 so that individual ones of the first frames are targeted to be used once to present a corresponding image on the HMD 100. In an example, the minimum throttle level 128 may throttle the frame rate of the application 104 to 90 frames per second to match a 90 Hz HMD 100. The minimum prediction level 126 may causes the compositor 114 to predict pose data of the HMD 100 for a time that corresponds to two VSync intervals 116 in the future, relative to a time of predicting the pose data for the individual ones of the first frames 106. When the prediction level 126 and the throttle level 128 are not currently set to the minimum level at block 302 (e.g., level 1), different targets may be utilized to render the series of frames 106. That is, at a prediction level 126 set to the first prediction level (e.g., 1), the compositor 114 may predict pose data of the HMD 100 for a time that corresponds to a first target number of VSync intervals 116 in the future (e.g., two VSync intervals in the future). At a throttle level 128 set to the first throttle level (e.g., 1), the compositor 114 may throttle the frame rate of the application 104 relative to the refresh rate of the HMD 100 so that individual ones of the first fames are targeted to be used a first target number of times (e.g., twice) to present multiple corresponding images on the HMD 100. The target number of times is "two" if the application 104 is throttled to half of the refresh rate of the HMD 100. In any case, the logic may proceed from block 302 if the compositor 114 determines that the prediction level 126 and the throttle level 128 are set to the same level, regardless of what level that is.

At 304, a determination may be made as to whether the prediction level 126 (or the throttle level 128) has been increased to a maximum level (e.g., 4). If the prediction level 126 (or the throttle level 128) has been maxed out, the process 300 may follow the "YES" route from block 304 to iterate the rendering of the first frames at block 302 without increasing the levels 126 and 128 any further. If, on the other hand, the prediction level 126 (or the throttle level 128) has not been increased to its maximum level, the process 300 may follow the "NO" route from block 304 to block 306.

At 306, the compositor 114 may track first statistics associated with the first frames, as they are rendered at block 302, and may store these first statistics in memory (e.g., one or more ring buffers 200). In this manner, a history of rendered frames can be maintained along with their statistics regarding, for example, the number of VSync intervals 116 the application 104 took to finish rendering each frame 106, as shown by block 308, the number of times each frame 106 was used to present an image(s) on the HMD 100, as shown by block 310, and possibly additional statistics.

At 312, based at least in part on the first statistics tracked and stored at block 306, the compositor 114 may determine a number of late frames out of a past N rendered frames 106, N being any suitable number. For N=5, the determination at block 312 may be to count the number of late frames out of those past five rendered frames.

At 314, the compositor 114 may determine whether the number of late frames counted at block 312 meets or exceeds a threshold number of late frames. In an example, the threshold number of late frames may be two late frames, such that the threshold is met at block 314 if two out of the past five rendered frames were late frames. Again, a "late frame" is a frame that took more than the target number of VSync intervals 116 for the application 104 to finish rendering using the GPU of the HMD 100, the target number based on the current prediction level 126. For the first prediction level (e.g., 0), the target number of VSync intervals 116 may be one VSync interval 116, so any frames that finished rendering in more than one VSync interval 116 are considered late frames at blocks 312 and 314. If the threshold is not met at block 314, the process 300 may follow the "NO" route from block 314 to iterate the rendering of the series of frames 106 at block 302 without increasing the prediction level 126 or the throttle level 128. If, however, the compositor 114 determines that the number of late frames counted at block 312 meets or exceeds the threshold number of late frames, the process 300 may follow the "YES" route from block 314 to block 316.

At 316, the compositor 114 may determine whether motion smoothing is enabled. "Motion smoothing," as used herein, may refer to a graphics processing technique that uses motion vectors generated by a video encoder of the GPU to modify pixel data of at least a subset of the first frames before rendering. Thus, if a feature that uses motion vectors from the GPU to modify frames before rendering is enabled, the process 300 may follow the "YES" route from block 316 to block 318.

At 318, the compositor 114 may increase both the prediction level 126 and the throttle level 128 in synchronization by one increment. That is, the prediction level 126 may be increased from a first prediction level to a second prediction level, and the throttle level 128 may be increased from a first throttle level to a second throttle level in synchronization with the increasing of the prediction level 126. "In synchronization," as used in this context, does not necessarily mean simultaneously, but rather, "along with" or without making an independent determination as to whether to increase the throttle level 128 or not. In other words, the throttle level 128 is increased with the prediction level 126 whenever motion smoothing is enabled.

At 320, the compositor 114 may clear (e.g., delete data from) the memory (e.g., the one or more ring buffers 200) that maintain the first statistics associated with the first frames, and the process 300 iterates by returning to block 302 where second frames of the series of frames 106 are rendered on the HMD 100, this time using the prediction level 126 set to the increased prediction level and the throttle level 128 set to the increased throttle level. For example, if the prediction level 126 and the throttle level 128 where increased from a first level (e.g., 0) to a second level (e.g., 1) in synchronization, the second frames rendered at block 302 following block 320 may be rendered with the compositor 114 predicting the pose data of the HMD 100 for a time that corresponds to a second target number of VSync intervals 116 (e.g., three VSync intervals) in the future, and the frame rate of the application 104 may be throttled relative to the refresh rate of the HMD 100 so that individual ones of the second frames rendered at block 302 are targeted to be used a second target number of times (e.g., twice) to present corresponding images on the HMD 100. In addition to clearing the ring buffer(s) 200, the next frame ID that the compositor 114 instructs the application 104 to generate may be tracked. This allows the ring buffer(s) 200 to start tracking second statistics starting with the frame having the tracked frame ID. This may be done so that other frames already in flight after changing the prediction level 126 and the throttle level 128 at block 318 are ignored (i.e., frames that did not have the new values applied are ignored).

Returning to block 316, if it is determined that motion smoothing is disabled at block 316, after a threshold number of late frames have been counted over the past N rendered frames, the process 300 may follow the "NO" route from block 316 to block 322. It is to be appreciated that the process 300 may be performed without performing the operations at decision block 316 (i.e., block 316 may be omitted from the process 300). Accordingly, in some embodiments, the process 300 may follow the "YES" route from block 314 directly to block 322, without performing the operations described with respect to blocks 316, 318, and 320.

At 322, the compositor 114 may increase the prediction level 126 by one increment without incrementing the throttle level 128. For example, the prediction level 126 may increase from a first prediction level to a second prediction level, and the throttle level 128 may remain at a first throttle level.

At 324, the compositor 114 may clear (e.g., delete data from) the memory (e.g., the one or more ring buffers 200) that maintain the first statistics associated with the first frames, and the process 300 continues in FIG. 3B, as shown by the off-page reference "A" in FIGS. 3A and 3B. In addition to clearing the ring buffer(s) 200, the next frame ID that the compositor 114 instructs the application 104 to generate may be tracked. This allows the ring buffer(s) 200 to start tracking second statistics starting with the frame having the tracked frame ID. This may be done so that other frames already in flight after changing the prediction level 126 at block 322 are ignored (i.e., frames that did not have the new values applied are ignored).

At 326, second frames of the series of frames 106 are rendered on the HMD 100, this time using the prediction level 126 set to an increased prediction level and the throttle level 128 remaining unchanged. For example, if the prediction level 126 and was increased from a first prediction level (e.g., 0) to a second prediction level (e.g., 1), the second frames rendered at block 326 following block 324 may be rendered with the compositor 114 predicting the pose data of the HMD 100 for a time that corresponds to a second target number of VSync intervals 116 (e.g., three VSync intervals) in the future. Meanwhile, with the throttle level 128 unchanged, the frame rate of the application 104 may continue to be throttled relative to the refresh rate of the HMD 100 so that the frame rate of the application 104 matches the refresh rate of the HMD 100, and individual ones of the second frames are still targeted to be used the first target number of times (e.g., once) to present corresponding images on the HMD 100.

At 328, the compositor 114 may track second statistics associated with the second frames, as they are rendered at block 326, and may store these second statistics in memory (e.g., the one or more ring buffers 200, which have been cleared of the stale data before the increase in the prediction level). These second statistics may include, without limitation, the number of VSync intervals 116 the application 104 took to finish rendering each frame 106, as shown by block 330, the number of times each frame 106 was used to present an image(s) on the HMD 100, as shown by block 332, and possibly additional statistics.

At 334, based at least in part on the second statistics tracked and stored at block 328, the compositor 114 may determine a number of over-presented frames out of a past M rendered frames, M being any suitable number. For M=20, the determination at block 334 may be to count the number of over-presented frames out of those past twenty rendered frames.

At 336, the compositor 114 may determine whether the number of over-presented frames counted at block 334 meets or exceeds a threshold number of over-presented frames. In an example, the threshold number of over-presented frames may be three over-presented frames, such that the threshold is met at block 336 if three out of the past twenty rendered frames were over-presented frames. Again, an "over-presented frame" is a frame that was used more than the target number of times to present multiple corresponding images on the HMD 100, the target number of times based on the current throttle level 128. For the first throttle level (e.g., 0), the target number of times may be one time (once), so any frames that were used more than once to present multiple corresponding images on the HMD 100 are considered over-presented frames at blocks 334 and 336. If the threshold is not met at block 336, the process 300 may follow the "NO" route from block 336 to iterate the rendering of the series of frames 106 at block 326 without increasing the throttle level 128. If, however, the compositor 114 determines that the number of over-presented frames counted at block 334 meets or exceeds the threshold number of over-presented frames, the process 300 may follow the "YES" route from block 336 to block 338.

At 338, the compositor 114 may increase the throttle level 128 by one increment without incrementing the prediction level 126. For example, the throttle level 128 may increase from a first throttle level to a second throttle level, and the prediction level 126 may remain at its existing level, which means that the prediction level 126 and the throttle level 128 are brought to the same level (e.g., 1).

At 340, the compositor 114 may clear (e.g., delete data from) the memory (e.g., the one or more ring buffers 200) that maintain the second statistics associated with the second frames, and the process 300 continues in FIG. 3A, as shown by the off-page reference "B" in FIGS. 3A and 3B. Accordingly, the process 300 can iterate, incrementing the prediction level 126 and the throttle level 128, potentially up to a maximum level, depending on the rendering performance of the application 104. For example, after the prediction level 126 and the throttle level 128 have been incremented by one, second or third frames of the series of frames 106 can be rendered at block 302 and the logic can repeat to determine whether to increase the prediction level 126 or both the prediction level 126 and throttle level 128 in synchronization.

Figure 4:
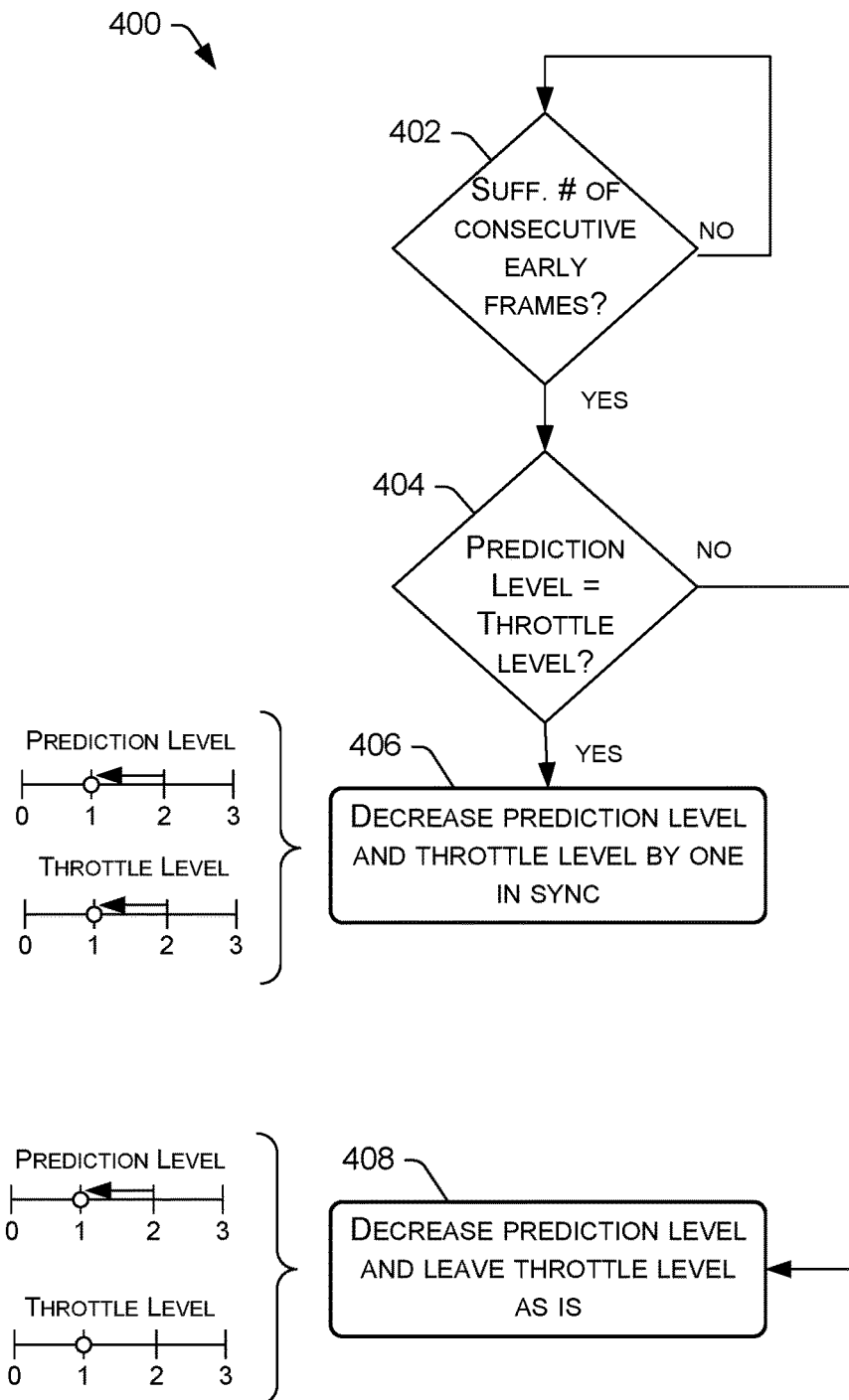
FIG. 4 a flow diagram of an example process for determining whether and when to decrease prediction and throttling levels while rendering frames on a HMD, in accordance with embodiments disclosed herein.

FIG. 4 a flow diagram of an example process 400 for determining whether and when to decrease prediction and throttling levels while rendering frames on a HMD 100, in accordance with embodiments disclosed herein. For discussion purposes, the process 400 is described with reference to the previous figures.

At 402, the compositor 114 may determine if a sufficient number of frames have been consecutively rendered early. That is, the compositor 114 may determine, at 402, whether the past P consecutively-rendered frames (P being any suitable number) took no more than a certain amount of time (in terms of VSync intervals 116) for the application 104 to finish rendering. Here, the certain amount of time is based on the current prediction level 126. For example, if the prediction level 126 has been previously increased to a first prediction level (e.g., 1), where the compositor 114 is predicting pose data of the HMD 100 for a time that corresponds to three VSync intervals 116 in the future, an early frame is a frame that the application 104 finished rendering within two VSync intervals 116. Likewise, if the prediction level 126 is at a second prediction level (e.g., 2), where the compositor 114 is predicting pose data of the HMD 100 for a time that corresponds to four VSync intervals 116 in the future, an early frame is a frame that the application 104 finished rendering within three VSync intervals 116. If it is determined, at block 402, that there have not been a sufficient number of early frames consecutively rendered, the process 400 may follow the "NO" route from block 402 to iterate the determination of whether a sufficient number of early frames have been consecutively rendered. As soon as a sufficient number (e.g., the past P frames) have been consecutively rendered early, the process 400 may follow the "YES" route from block 402 to block 404.

At 404, the compositor 114 may determine whether the prediction level 126 and the throttle level 128 are currently set to the same level (e.g., both set to the third level, 2). If the prediction level 126 and the throttle level 128 are currently set to the same level, the process 400 may follow the "YES" route from block 404 to block 406.

At 406, the compositor 114 may decrease both the prediction level 126 and the throttle level 128 by one decrement in synchronization. That is, the prediction level 126 may be decreased from the third prediction level to the second prediction level, and the throttle level 128 may be decreased from the third throttle level to the second throttle level in synchronization with the decreasing of the prediction level.

Returning to block 404, if the prediction level 126 and the throttle level 128 are not currently set to the same level (e.g., the throttle level 128 is set to one level lower than the current prediction level 128), the process 400 may follow the "NO" route from block 404 to block 408.

At 408, the compositor 114 may decrease the prediction level 126 by one decrement, without decreasing the throttle level 128. For example, the prediction level 126 may be decreased from the third prediction level to the second prediction level, which means that the prediction level 126 and the throttle level 128 are brought to the same level. In this manner, the throttle level 128 decreases with the prediction level 126 if they are set at the same level.

Figure 5:
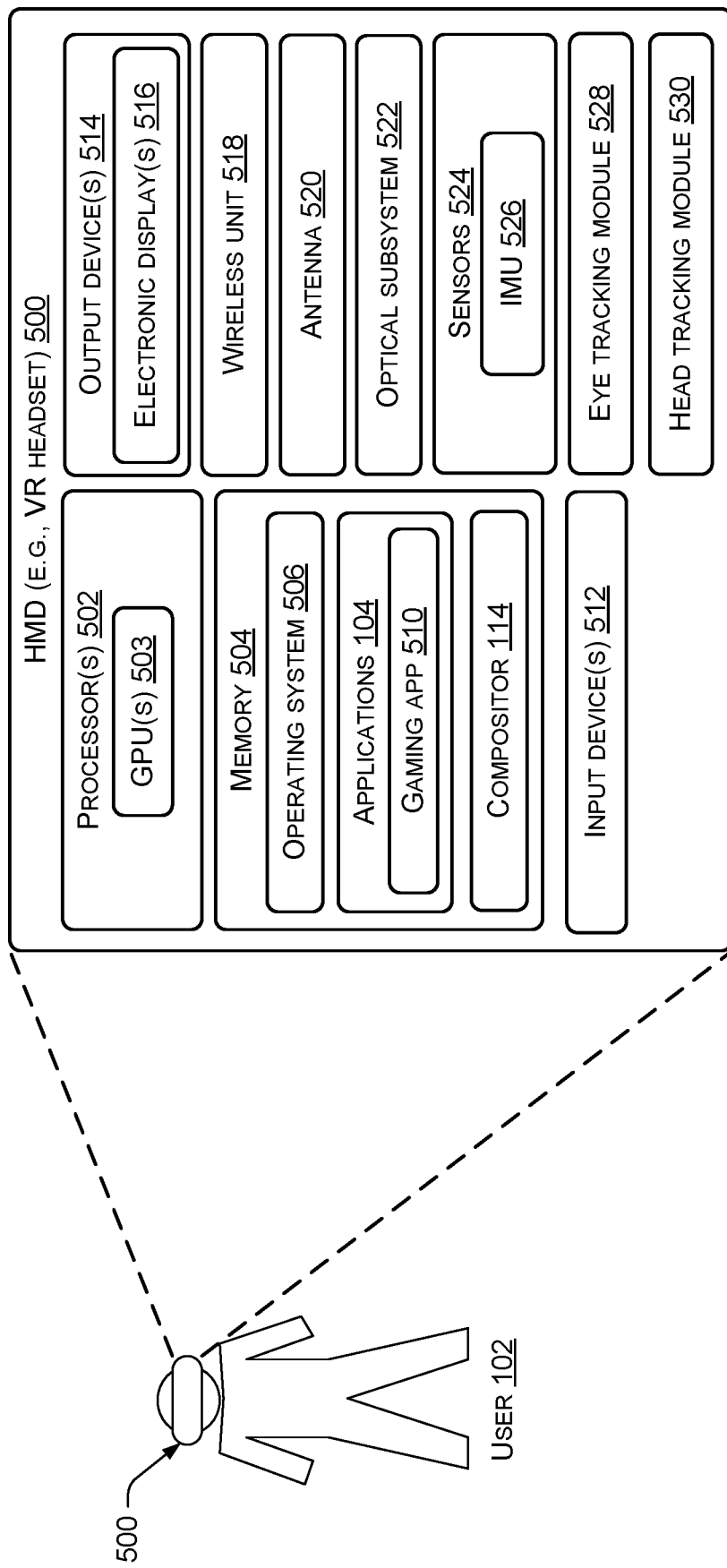
FIG. 5 illustrates example components of a wearable device, such as a VR headset, in which the techniques disclosed herein can be implemented.

FIG. 5 illustrates example components of a HMD 500, such as a VR headset, according to the embodiments disclosed herein may be embedded. The HMD 500 may be the same as, or similar to, the HMD 100 referenced in the previous figures, and, therefore, the components of the HMD 500 shown in FIG. 5 may be implemented in the HMD 100. The HMD 500 may be implemented as a standalone device that is to be worn by a user 102 (e.g., on a head of the user 102). In some embodiments, the HMD 500 may be head-mountable, such as by allowing a user 102 to secure the HMD 500 on his/her head using a securing mechanism (e.g., an adjustable band) that is sized to fit around a head of a user 102. In some embodiments, the HMD 500 comprises a virtual reality (VR) or augmented reality (AR) headset that includes a near-eye or near-to-eye display(s). As such, the terms "wearable device", "wearable electronic device", "VR headset", "AR headset", and "head-mounted display (HMD)" may be used interchangeably herein to refer to the device 500 of FIG. 5. However, it is to be appreciated that these types of devices are merely example of a HMD 500, and it is to be appreciated that the HMD 500 may be implemented in a variety of other form factors.

In the illustrated implementation, the HMD 500 includes one or more processors 502 and memory 504 (e.g., computer-readable media 504). In some implementations, the processors(s) 502 may include a central processing unit (CPU), a graphics processing unit (GPU)(s) 503, both CPU and GPU 503, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 502 may possess its own local memory, which also may store program modules, program data, and/or one or more operating systems.

The memory 504 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 504 may be implemented as computer-readable storage media ("CRSM"), which may be any available physical media accessible by the processor(s) 502 to execute instructions stored on the memory 502. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 502.

In general, the HMD 500 may include logic (e.g., software, hardware, and/or firmware, etc.) that is configured to implement the techniques, functionality, and/or operations described herein. The computer-readable media 504 is shown as including various modules, such as instruction, datastores, and so forth, which may be configured to execute on the processor(s) 502 for carrying out the techniques, functionality, and/or operations described herein. A few example functional modules are shown as stored in the computer-readable media 504 and executable on the processor(s) 502, although the same functionality may alternatively be implemented in hardware, firmware, or as a system on a chip (SOC), and/or other logic.

An operating system module 506 may be configured to manage hardware within and coupled to the HMD 500 for the benefit of other modules. In addition, in some instances the HMD 500 may include one or more applications 104 stored in the memory 504 or otherwise accessible to the HMD 500. In this implementation, the application(s) 104 includes a gaming application 510. However, the HMD 500 may include any number or type of applications and is not limited to the specific example shown here. The gaming application 510 may be configured to initiate gameplay of a video-based, interactive game (e.g., a VR game) that is playable by the user 102, and to output frames (e.g., actual frames 106) to be rendered on the display panels of the HMD 500. A compositor 114, in combination with other logic of the HMD 500, may be configured to perform the techniques described herein to adjust the prediction level 126 and the throttle level 128 based on the rendering performance of the application 104.

Generally, the HMD 500 has input devices 512 and output devices 514. The input devices 512 may include control buttons. In some implementations, one or more microphones may function as input devices 512 to receive audio input, such as user voice input. In some implementations, one or more cameras or other types of sensors (e.g., inertial measurement unit (IMU)) may function as input devices 512 to receive gestural input, such as a hand and/or head motion of the user 102. In some embodiments, additional input devices 512 may be provided in the form of a keyboard, keypad, mouse, touch screen, joystick, and the like. In other embodiments, the HMD 500 may omit a keyboard, keypad, or other similar forms of mechanical input. Instead, the HMD 500 may be implemented relatively simplistic forms of input device 512, a network interface (wireless or wire-based), power, and processing/memory capabilities. For example, a limited set of one or more input components may be employed (e.g., a dedicated button to initiate a configuration, power on/off, etc.) so that the HMD 500 can thereafter be used. In one implementation, the input device(s) 512 may include control mechanisms, such as basic volume control button(s) for increasing/decreasing volume, as well as power and reset buttons.

The output devices 514 may include a display(s) 516, which may include one or multiple display panels (e.g., a stereo pair of display panels). The output devices 514 may further include, without limitation, a light element (e.g., LED), a vibrator to create haptic sensations, a speaker(s) (e.g., headphones), and/or the like. There may also be a simple light element (e.g., LED) to indicate a state such as, for example, when power is on.

The HMD 500 may further include a wireless unit 518 coupled to an antenna 520 to facilitate a wireless connection to a network. The wireless unit 518 may implement one or more of various wireless technologies, such as Wi-Fi, Bluetooth, radio frequency (RF), and so on. It is to be appreciated that the HMD 500 may further include physical ports to facilitate a wired connection to a network, a connected peripheral device (including a PC, game console, etc.), or a plug-in network device that communicates with other wireless networks.

The HMD 500 may further include optical subsystem 522 that directs light from the electronic display(s) 516 to a user's eye(s) using one or more optical elements. The optical subsystem 522 may include various types and combinations of different optical elements, including, without limitations, such as apertures, lenses (e.g., Fresnel lenses, convex lenses, concave lenses, etc.), filters, and so forth. In some embodiments, one or more optical elements in optical subsystem 522 may have one or more coatings, such as anti-reflective coatings. Magnification of the image light by optical subsystem 522 allows electronic display(s) 516 to be physically smaller, weigh less, and consume less power than larger displays. Additionally, magnification of the image light may increase a field of view (FOV) of the displayed content (e.g., images). For example, the FOV of the displayed content is such that the displayed content is presented using almost all (e.g., 120-150 degrees diagonal), and in some cases all, of the user's FOV. AR applications may have a narrower FOV (e.g., about 40 degrees FOV). Optical subsystem 522 may be designed to correct one or more optical errors, such as, without limitation, barrel distortion, pincushion distortion, longitudinal chromatic aberration, transverse chromatic aberration, spherical aberration, comatic aberration, field curvature, astigmatism, and so forth. In some embodiments, content provided to electronic display(s) 516 for display is pre-distorted, and optical subsystem 522 corrects the distortion when it receives image light from electronic display(s) 516 generated based on the content.

The HMD 500 may further include one or more sensors 524, such as sensors used to generate motion, position, and orientation data. These sensors 524 may be or include gyroscopes, accelerometers, magnetometers, video cameras, color sensors, or other motion, position, and orientation sensors. The sensors 524 may also include sub-portions of sensors, such as a series of active or passive markers that may be viewed externally by a camera or color sensor in order to generate motion, position, and orientation data. For example, a VR headset may include, on its exterior, multiple markers, such as reflectors or lights (e.g., infrared or visible light) that, when viewed by an external camera or illuminated by a light (e.g., infrared or visible light), may provide one or more points of reference for interpretation by software in order to generate motion, position, and orientation data. The HMD 500 may include light sensors that are sensitive to light (e.g., infrared or visible light) that is projected or broadcast by base stations in the environment of the HMD 500.

In an example, the sensor(s) 524 may include an inertial measurement unit (IMU) 526. IMU 526 may be an electronic device that generates calibration data based on measurement signals received from accelerometers, gyroscopes, magnetometers, and/or other sensors suitable for detecting motion, correcting error associated with IMU 526, or some combination thereof. Based on the measurement signals such motion-based sensors, such as the IMU 526, may generate calibration data indicating an estimated position of HMD 500 relative to an initial position of HMD 500. For example, multiple accelerometers may measure translational motion (forward/back, up/down, left/right) and multiple gyroscopes may measure rotational motion (e.g., pitch, yaw, and roll). IMU 526 can, for example, rapidly sample the measurement signals and calculate the estimated position of HMD 500 from the sampled data. For example, IMU 526 may integrate measurement signals received from the accelerometers over time to estimate a velocity vector and integrates the velocity vector over time to determine an estimated position of a reference point on HMD 500. The reference point is a point that may be used to describe the position of the HMD 500. While the reference point may generally be defined as a point in space, in various embodiments, reference point is defined as a point within HMD 500 (e.g., a center of the IMU 526). Alternatively, IMU 526 provides the sampled measurement signals to an external console (or other computing device), which determines the calibration data.

The sensors 524 may operate at relatively high frequencies in order to provide sensor data at a high rate. For example, sensor data may be generated at a rate of 1000 Hz (or 1 sensor reading every 1 millisecond). In this way, one thousand readings are taken per second. When sensors generate this much data at this rate (or at a greater rate), the data set used for predicting motion is quite large, even over relatively short time periods on the order of the tens of milliseconds.

As mentioned, in some embodiments, the sensors 524 may include light sensors that are sensitive to light emitted by base stations in the environment of the HMD 500 for purposes of tracking position and/or orientation, pose, etc., of the HMD 500 in 3D space. The calculation of position and/or orientation may be based on timing characteristics of light pulses and the presence or absence of light detected by the sensors 524.

The HMD 500 may further include an eye tracking module 528. A camera or other optical sensor inside HMD 500 may capture image information of a user's eyes, and eye tracking module 528 may use the captured information to determine interpupillary distance, interocular distance, a three-dimensional (3D) position of each eye relative to HMD 500 (e.g., for distortion adjustment purposes), including a magnitude of torsion and rotation (i.e., roll, pitch, and yaw) and gaze directions for each eye. In one example, infrared light is emitted within HMD 500 and reflected from each eye. The reflected light is received or detected by a camera of the HMD 500 and analyzed to extract eye rotation from changes in the infrared light reflected by each eye. Many methods for tracking the eyes of a user 102 can be used by eye tracking module 528. Accordingly, eye tracking module 528 may track up to six degrees of freedom of each eye (i.e., 3D position, roll, pitch, and yaw) and at least a subset of the tracked quantities may be combined from two eyes of a user 102 to estimate a gaze point (i.e., a 3D location or position in the virtual scene Where the user is looking). For example, eye tracking module 528 may integrate information from past measurements, measurements identifying a position of a user's 102 head, and 3D information describing a scene presented by electronic display(s) 516. Thus, information for the position and orientation of the user's 102 eyes is used to determine the gaze point in a virtual scene presented by HMD 500 where the user 102 is looking.

The HMD 500 may further include a head tracking module 530. The head tracking module 530 may leverage one or more of the sensor 524 to track head motion, including head rotation, of the user 102, as described above. For example, the head tracking module 530 can track up to six degrees of freedom of the HMI) 500 (i.e., 3D position, roll, pitch, and yaw). These calculations can be made at every frame 106 of a series of frames 106 so that the application 104 can determine how to render a scene in the next frame 106 (even for re-projected frames 104) in accordance with the head position and orientation. In some embodiments, the head tracking module 530 and/or the compositor 114 using the head tracking module 530 is configured to predict a future position and/or orientation of the HMD 500 based on current and/or past data. This is because the application is asked to render a frame 106 before the user 102 actually sees the light (and, hence, the image) on the display(s) 516. Accordingly, a next frame 106 can be rendered based on this future prediction of head position and/or orientation that was made at an earlier point in time, such as roughly 25-30 milliseconds (ms) prior to rendering the frame 106. Rotation data provided by the head tracking module 530 can be used to determine both direction of HMD 500 rotation, and amount of HMD 500 rotation in any suitable unit of measurement. For example, rotational direction may be simplified and output in terms of positive or negative horizontal and positive or negative vertical directions, which correspond to left, right, up, and down. Amount of rotation may be in terms of degrees, radians, etc. Angular velocity may be calculated to determine a rate of rotation of the HMD 500.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
   rendering first frames of a series of frames on a head-mounted display (HMD) using a prediction level set to a first prediction level, including, for a first frame of the first frames, causing one or more processors to predict pose data of the HMD for a first future time based on the first prediction level;
   determining a first statistic related to a rendering performance of an application;
   changing, based at least in part on the first statistic, the prediction level from the first prediction level to a second prediction level; and
   rendering second frames of the series of frames on the HMD using the prediction level set to the second prediction level, including, for a second frame of the second frames, causing the one or more processors to predict the pose data of the HMD for a second future time based on the second prediction level.

2. The method of claim 1, wherein the changing of the prediction level comprises increasing the prediction level, the method further comprising:
   determining a second statistic related to the rendering performance of the application, the second statistic different than the first statistic;
   decreasing, based at least in part on the second statistic, the prediction level from the second prediction level to the first prediction level; and
   rendering third frames of the series of frames on the HMD using the prediction level set to the first prediction level.

3. The method of claim 1, wherein the first statistic is based at least in part on an amount of time the application took to finish rendering at least one of the first frames.

4. The method of claim 1, wherein the first frames are rendered using a throttle level set to a first throttle level, the first throttle level causing the one or more processors to throttle a frame rate of the application relative to a refresh rate of the HMD so that the first frame is targeted to be used a first target number of times to present one or more corresponding first images on the HMD.

5. The method of claim 4, further comprising changing the throttle level from the first throttle level to a second throttle level in synchronization with the changing of the prediction level.

6. The method of claim 4, wherein the changing of the prediction level comprises increasing the prediction level, the method further comprising, after the increasing of the prediction level:
   determining a second statistic related to the rendering performance of the application, the second statistic different than the first statistic; and
   increasing the throttle level from the first throttle level to a second throttle level based at least in part on the second statistic.

7. The method of claim 6, wherein the second statistic is based at least in part on a number of times at least one of the second frames was used to present one or more corresponding second images on the HMD.

8. The method of claim 1, wherein the first future time is relative to a first time of predicting the pose data for the first frame.

9. A system comprising:
   one or more processors; and
   memory storing computer-executable instructions that, when executed by the one or more processors, cause the one or more processors to:
   render first frames of a series of frames on a head-mounted display (HMD) using a prediction level set to a first prediction level to predict, for a first frame of the first frames, pose data of the HMD for a first future time based on the first prediction level;
   determine a first statistic related to a rendering performance of an application;
   change, based at least in part on the first statistic, the prediction level from the first prediction level to a second prediction level; and
   render second frames of the series of frames on the HMD using the prediction level set to the second prediction level to predict, for a second frame of the second frames, the pose data of the HMD for a second future time based on the second prediction level.

10. The system of claim 9, wherein the first statistic is based at least in part on an amount of time the application took to finish rendering at least one of the first frames.

11. The system of claim 9, wherein the first frames are rendered using a throttle level set to a first throttle level to throttle a frame rate of the application relative to a refresh rate of the HMD so that the first frame is targeted to be used a first target number of times to present one or more corresponding first images on the HMD.

12. The system of claim 11, wherein the computer-executable instructions, when executed by the one or more processors, further cause the one or more processors to change the throttle level from the first throttle level to a second throttle level in synchronization with changing the prediction level.

13. The system of claim 11, wherein changing the prediction level comprises decreasing the prediction level, wherein the prediction level and the throttle level are independently adjustable using a same scale, and wherein the computer-executable instructions, when executed by the one or more processors, further cause the one or more processors to:
- determine that the prediction level and the throttle level are not set to a same level on the same scale,
- wherein decreasing the prediction level occurs without decreasing the throttle level based at least in part on determining that the prediction level and the throttle level are not set to the same level.

14. The system of claim 9, wherein the first future time is a time that corresponds to a first target number of vertical synchronization (VSync) intervals in the future, relative to a first time of predicting the pose data for the first frame.

15. A method comprising:
- rendering first frames of a series of frames on a head-mounted display (HMD) using a throttle level set to a first throttle level, the first throttle level causing one or more processors to throttle a frame rate of an application relative to a refresh rate of the HMD so that a first frame of the first frames is targeted to be used a first target number of times to present one or more corresponding first images on the HMD;
- determining a first statistic related to a rendering performance of the application;
- changing, based at least in part on the first statistic, the throttle level from the first throttle level to a second throttle level; and
- rendering second frames of the series of frames on the HMD using the throttle level set to the second throttle level, the second throttle level causing the one or more processors to throttle the frame rate of the application relative to the refresh rate of the HMD so that a second frame of the second frames is targeted to be used a second target number of times to present corresponding second images on the HMD.

16. The method of claim 15, wherein the changing of the throttle level comprises increasing the throttle level, and wherein the second target number of times is greater than the first target number of times, the method further comprising:
- determining a second statistic related to the rendering performance of the application, the second statistic different than the first statistic;
- decreasing, based at least in part on the second statistic, the throttle level from the second throttle level to the first throttle level; and
- rendering third frames of the series of frames on the HMD using the throttle level set to the first throttle level.

17. The method of claim 15, wherein the first statistic is based at least in part on a number of times at least one of the first frames was used to present multiple images of the corresponding first images on the HMD.

18. The method of claim 15, wherein the first frames are rendered using a prediction level set to a first prediction level, including, for the first frame, causing the one or more processors to predict pose data of the HMD for a first future time based on the first prediction level.

19. The method of claim 18, further comprising changing the prediction level from the first prediction level to a second prediction level in synchronization with the changing of the throttle level.

20. The method of claim 18, wherein the changing of the throttle level comprises increasing the throttle level, and wherein the second target number of times is greater than the first target number of times, the method further comprising, after the increasing of the throttle level:
- determining a second statistic related to the rendering performance of the application, the second statistic different than the first statistic; and
- increasing the prediction level from the first prediction level to a second prediction level based at least in part on the second statistic.

21. The method of claim 15, wherein the first statistic is based at least in part on an amount of time the application took to finish rendering at least one of the first frames.

* * * * *